United States Patent
Pannhorst et al.

(10) Patent No.: US 7,566,672 B2
(45) Date of Patent: Jul. 28, 2009

(54) GLASS COMPOSITION EXCLUSIVELY CONSISTING OF OXIDES WHICH ALREADY AT LOW TEMPERATURES FORM VOLATILE FLUORIDES BY REACTION WITH FLUORINE AND ITS USE

(75) Inventors: Wolfgang Pannhorst, Mainz (DE); Ulf Dahlmann, Mainz (DE); Ulrich Fotheringham, Wiesbaden (DE); Juergen Leib, Freising (DE); Rainer Liebald, Nauheim (DE)

(73) Assignee: Schott AG, Mainz (DE)

( * ) Notice: Subject to any disclaimer, the term of this patent is extended or adjusted under 35 U.S.C. 154(b) by 266 days.

(21) Appl. No.: 11/487,620

(22) Filed: Jul. 17, 2006

(65) Prior Publication Data
US 2007/0078048 A1 Apr. 5, 2007

(30) Foreign Application Priority Data
Jul. 21, 2005 (DE) ...................... 10 2005 034 785

(51) Int. Cl.
C03C 3/097 (2006.01)
C03C 3/089 (2006.01)
C03C 17/00 (2006.01)
C03C 21/00 (2006.01)
C03C 23/00 (2006.01)
C03C 25/00 (2006.01)

(52) U.S. Cl. ............................... 501/63; 501/65; 65/31
(58) Field of Classification Search .................. 501/63, 501/65
See application file for complete search history.

(56) References Cited

U.S. PATENT DOCUMENTS

| | | | |
|---|---|---|---|
| 4,011,006 A * | 3/1977 | Fleming et al. ............. 385/141 |
| 4,160,672 A * | 7/1979 | Rapp ............................. 501/8 |
| 4,366,253 A | 12/1982 | Yagi | |
| 4,562,161 A * | 12/1985 | Mennemann et al. ......... 501/59 |
| 4,576,920 A | 3/1986 | MacDowell | |
| 4,666,867 A | 5/1987 | Beall et al. | |
| 6,001,445 A | 12/1999 | Itoh et al. | |
| 6,271,150 B1 * | 8/2001 | Croswell et al. ............. 438/760 |
| 2003/0016928 A1 * | 1/2003 | Nara et al. .................. 385/129 |

FOREIGN PATENT DOCUMENTS

| | | |
|---|---|---|
| JP | 57077045 | 5/1982 |
| JP | 62093642 | 4/1987 |
| JP | 63265840 | 11/1988 |
| JP | 2004026606 | 1/2004 |

OTHER PUBLICATIONS

Baret et al. Silica-Based Oxide Systems II. Determination of Silica-Based, Low Flow Temperature Glasses fro Electronic Application from Relations Between Glass Transition, Flow, and Liquidus Temperatures. J Electrochem Soc, vol. 138, No. 9, Sep. 1991. pp. 2863-2838.*
E. Metwalli and C.P. Pantano Reactive Ion Etching of Glasses: Composition Dependence. Nuclear Instruments and Methods in Physics Research B 207 (2003) p. 21-27.
Junting Liu et al, "Etch Rate and Surface Morphology of Plasma Etched Glass and Glass-Ceramic Substrates." Journal of noN-Crystalline Solids 342 (2004) p. 110-115.
G. Baret, R, Madar, and C. Bernard, "Silica-Based Oxide Systems." J. Electrochem Soc., vol. 138, No. 9, Sep. 1991. p. 2836-2838.
M.K. Abatchev, C.K. Lee, C.O. Jung, Y.B. Koh, and M.Y. Lee. "Study of the Boron-Phosphorous Doped and Undoped Silicate Glass Etching in CHF3/AR Plasma." Electrochemical Society Proceedings vol. 96-12. p. 522-530.

* cited by examiner

*Primary Examiner*—Karl E Group
*Assistant Examiner*—Noah S Wiese
(74) *Attorney, Agent, or Firm*—Michael J. Striker

(57) ABSTRACT

The glass is advantageous for microstructuring, especially reactive ion etching with fluorine and fluorine compounds, and has a glass composition based on oxide content and expressed in mol % of: $SiO_2$, 40-70; $GeO_2$, 0-30; $B_2O_3$, 5-20; $P_2O_5$, 5-20; $WO_3$, 0-10; $As_2O_3$, 0-10; $Yb_2O_3$, 0-5; and $Lu_2O_3$, 0-5. Microstructure components, such as micro arrays, Fresnel lenses, micro wafers, or micro lens wafers, made by a method including reactive ion etching from the glass are also part of the present invention.

9 Claims, No Drawings

GLASS COMPOSITION EXCLUSIVELY CONSISTING OF OXIDES WHICH ALREADY AT LOW TEMPERATURES FORM VOLATILE FLUORIDES BY REACTION WITH FLUORINE AND ITS USE

CROSS-REFERENCE

The invention described and claimed herein below is also described and claimed in German Patent Application 10 2005 034 785.1, which was filed on Jul. 21, 2005 in Germany. The aforesaid German Patent Application provides the basis for a claim of priority of invention for the invention claimed in the appended claims under 35 U.S.C. 119 (a) to (d).

BACKGROUND OF THE INVENTION

The present invention relates to a novel glass composition which exclusively comprises oxides which at low temperatures form volatile fluorides and its use in micro structuring methods.

Today, within the scope of the permanently increasing miniaturisation, the development of micro optics is an intensively examined field of development. A potential technology for the structuring of intermediate products is reactive ion etching (RIE). In this case, in bodies of silicon dioxide, such as for example wafers, the desired micro structures are generated in a plasma discharge reactor through a masking technique.

In the case of micro structuring of $SiO_2$, volatile silicon fluoride which does not condense on the article due to the state of aggregation is formed with the use of for example $CF_4$ or another fluorine-containing gas. $SiO_2$ is a glass having many positive properties and may further be obtained in different geometries. Thus, $SiO_2$ is a suitable material for this method. But currently, $SiO_2$ is the only material which is available in bulk form for this micro structuring method. As a single component, it cannot fulfil the entirety of many demands. One significant disadvantage is e.g. that $SiO_2$ melts only at very high temperatures (Ts=1.723° C.) and thus, the production generates high costs. Certain geometries can only be realized by costly methods of cold reprocessing. Furthermore, the low coefficient of thermal expansion of $SiO_2$ glass which is 0.5 ppm/K is disadvantageous, when it should be linked with other materials, e.g. semiconductors, for example in the so-called "wafer level assembly", wherein wafers of glass and of semiconductor materials should be linked and then processed together.

Finally, the low refractive index of $SiO_2$ glass is disadvantageous, when lenses with high numerical aperture should be produced.

In this case, glasses would be preferable which have expansion coefficients in the range of the values of semiconductor materials, namely ca. 2 to 5 ppm/K, which have suitable refractive indices and which further can be produced in different required geometries.

There are a series of commercially available glasses which fulfil the demands regarding geometry, expansion coefficient and refractive index, but they all have the disadvantage that by the use of reactive ion etching which is also called RIE they form solid fluorides which after their formation immediately condense on the body to be structured. This applies to all known bulk glasses—with exception of $SiO_2$—, since most elements of the periodic table form solid fluorides at room temperature. For example borosilicate glasses, such as for example Duran®, are available as flat glasses and can be linked well with Si, because of their expansion coefficient of 3.3 ppm/K, but in this case there is a disadvantage which lies in the fact that with the use of the RIE method the generated micro structures have low quality, since the oxides of Al, Na and K form solid fluorides during the reaction with F. There are investigations to overcome this disadvantage by a combined etching by means of the RIE method and sputtering (E. Metwalli and C. P. Pantano, Reactive ion etching of glasses: Composition dependence, Nucl. Instr. Meth. Phys. Res. B 207 (2003) 21-27) which however is costly and undesired and in addition, nearly no micro structures with optical quality can be produced with this. Furthermore, the achievable etching rates decrease to a value which is higher than the half of the value of $SiO_2$, thus the economical desirability of the method is remarkably lower.

Analogously, another report in the literature (Journal of Non-Crystalline Solids 342, (2004), 110-115) shows that during the reactive ion etching very complex processes take place and have to be managed, when it should be tried to microstructure alkali- or alkaline earth-containing glasses or glass ceramics by means of RIE.

From the state of the art (see J. Electrochem. Soc., Vol. 138, No. 9, pages 2836-2838, September 1991), glass systems are known which contain $SiO_2$, $GeO_2$, $B_2O_3$ and $P_2O_5$. They could be used in the micro linking technique in the form of reflow processes, namely for the demand of glasses which have a reflow temperature which is remarkably lower than that of $SiO_2$. However, these glasses contain at least 71% by mole of $SiO_2$ and are featured by glass transition temperatures ($T_g$) of higher than 800° C. Although the processing temperatures of these glasses are not mentioned in the literature, it can certainly be expected that all the glasses have processing temperatures which are clearly higher than 1.400° C. and thus cannot be melted in big conventional melting aggregates.

SUMMARY OF THE INVENTION

Accordingly, there is a need to provide a glass system which behaves advantageously during the micro structuring, in particular during a method for reactive ion etching. In this case, the glass should have a constitution such that during the reaction with fluorine at low temperatures exclusively volatile fluorides are generated. In the present invention, with the term "low temperature" is meant that the fluorides formed from the oxides, such as for example $SiF_4$ or $BF_3$, are volatile at a temperature of 25° C. Further, the glasses should fulfil additional requirements. It is important that the glasses can be melted in conventional melting aggregates, such as tanks or crucibles; thus, the melting temperature should be in a range of 1.600 or 1.700° C. and therewith it should be far below the melting temperature of $SiO_2$ (ca. 2.500° C.). In addition, the glasses should be producible in different required geometries and should have expansion coefficients which are compatible with semiconductor materials, if possible. Further, a refractive index which is as high as possible and an Abbe number which is different from that of $SiO_2$ (namely of 68) are desired.

This object is solved by the glasses according to the present invention which exclusively comprise oxides of B, Si, P, Ge, As, W, Yb and Lu, preferably only oxides of B, Si, P, Ge, As and W and most preferably only of B, Si, P and Ge.

The glasses according to the present invention consist of the following components (data in % by mole):

| | |
|---|---|
| SiO$_2$ | 40-70 |
| GeO$_2$ | 0-30 |
| B$_2$O$_3$ | 5-20 |
| P$_2$O$_5$ | 5-20 |
| As$_2$O$_3$ | 0-10 |
| WO$_3$ | 0-10 |
| Yb$_2$O$_3$ | 0-5 |
| Lu$_2$O$_3$ | 0-5 |

Preferable embodiments consist of the following four components (data in % by mole):

| | |
|---|---|
| SiO$_2$ | 50-65 |
| GeO$_2$ | 3-30 |
| B$_2$O$_3$ | 10-18 |
| P$_2$O$_5$ | 10-18 |

The formulation "consisting of" should allow that normal impurities, such as remainders of fining agents or impurities of the raw materials, may be contained in the composition.

Higher contents of SiO$_2$ are not desired, since the glasses become too viscous and cannot be melted in conventional aggregates any more. The glasses according to the present invention contain 40 to 70, preferably 50 to 70, further preferably 60 to 70% by mole of SiO$_2$. Embodiments with contents of 40 to 65% by mole, preferably 50 to 65% by mole and further preferably of 60 to 65% by mole are also possible.

Both, B$_2$O$_3$ and P$_2$O$_5$ are components which lower the viscosity of the glasses, wherein it has also to be considered that both also lower the chemical stability of the glasses. This effect of lowering the chemical stability can be alleviated when both oxides are present in the glass in approximately the same molar portions which is a preferred embodiment of the invention. Portions of 5% by mole each for both oxides are necessary to achieve a sufficient lowering of the viscosity of the SiO$_2$ glass, but on the other hand, portions of 20% by mole each should not be exceeded, since otherwise the chemical stability is lowered so much that processing and purification methods are not possible any longer. B$_2$O$_3$ is present in amounts of 5 to 20, preferably of 10 to 20 and further preferably of 15% by mole. P$_2$O$_5$ is present in the glass in amounts of 5 to 20, preferably of 10 to 20 and further preferably of 15% by mole.

Also GeO$_2$ is a component which lowers the viscosity of the glass, however in view of the costs, this one will be used preferably by a person skilled in the art in amounts which are as low as possible. The component may be present in the glass in amounts of 0 to 30, of 3 to 30, of 7 to 30% by mole. The component may also be present in the glass in amounts of 0 to 20% by mole, 3 to 20% by mole and of 7 to 20% by mole. Ranges of the amounts of GeO$_2$ of 0 to 10, 3 to 10 and 7 to % by mole are also possible.

As$_2$O$_3$ may be used as a fining agent, but preferably it should be omitted, because it is known that this substance is toxic.

WO$_3$ is known in optical glasses as glass component. But according to preferred embodiments, it is not contained in the glass, since the glasses may undesirably become coloured by the change of the oxidation state.

Yb$_2$O$_3$ and Lu$_2$O$_3$ may be used in smaller portions, in particular, when the glasses should fulfil special optical functions. The amounts of these oxides can be 0 to 5% by mole, 1 to 5% by mole or 3 to 5% by mole, wherein the upper limit of 5% by mole may also be 4% by mole for each of the above given ranges.

Advantageously, the glasses according to the present invention can be melted in conventional melting aggregates. This is characterized by the so-called processing temperature $V_A$, at which the glasses have a viscosity of $10^4$ dPas. According to the present invention, values of 1.000° C. to 1.400° C. can be achieved here, whereas the processing temperature of SiO$_2$ is approximately 2.350° C.

The processing temperatures ($V_A$) of the glasses according to the present invention are in a range of 1.000 to 1.400° C., preferably of 1.050 to 1.350° C., most preferably at 1.100 to 1.300° C.

A further very important parameter for the processability of a glass is the glass transition temperature $T_g$. It characterizes the change of the viscoelastic over-cooled melt into the elastic and thus solid glass. Within glass families, $V_A$ and $T_g$ strongly correlate with each other. In the present glass family, the requirement of a processing temperature of $V_A$ of lower than or equal to 1.400° C. approximately corresponds to a requirement of a glass transition temperature of $T_g$ of lower than or equal to 700° C.

The expansion coefficients of the glasses according to the present invention are in a range of 3 to 6 ppm/K, preferably of 4 to 5.5 ppm/K, most preferably at 4.3 to 5.3 ppm/K.

The refractive indices of the glasses according to the present invention are in a range of 1.48 to 1.55, preferably of 1.495 to 1.525.

The Abbe number of the glasses according to the present invention is preferably in the range of 58 to 66. It is known that glasses having Abbe numbers of ca. 61 and $P_{gF}$ values (this value characterises the dispersion of the refractive index in the visible spectral region) of ca. 0.53 have an anomalous optical state. Therefore at the same time, they can be used well as glasses in normal imaging optics.

The glasses according to the present invention may be used in a superior manner in production methods in which micro structures are formed, in particular in such methods in which the technique of reactive ion etching is used. Glasses according to the present invention have a higher RIE etching rate than SiO$_2$, namely the etching rate was 2-respectively 3-fold higher, wherein as the plasma gas CF$_4$ respectively SF$_6$ were used.

Since micro structuring techniques are generally aimed at small glass amounts, the technological advantages of the glasses according to the present invention which are readily meltable and stable and which therefore can be processed by many forming methods become the focus of attention and completely compensate the costs of the rather expensive starting component germanium oxide.

EXAMPLE 1

According to the following method, the following glasses were produced: The glasses were melted in Quarzal crucibles with a melting volume for ½ litres in a gas oven at temperatures of 1.550 to 1.700° C. and subsequently cast into Pt crucibles. In the Pt crucibles, it was fined at the same or slightly higher temperatures for 1 to 2 hours and subsequently it was stirred at the same or slightly lower temperatures for ca. ½ hour. In the case of viscous glasses, the crucibles were placed into a high temperature oven at ca. 1.700° C. for further 4 to 8 hours for dropping. Subsequently, the glasses were cast into metal moulds and placed into an oven which was pre-heated to a temperature of 600 to 730° C., allowed to stay therein for ½ hour and subsequently cooled slowly.

$B_2O_3$ and $P_2O_5$ are readily volatile components; also $GeO_2$ evaporates more readily than $SiO_2$. In the following examples, the synthesis values of the compositions are given in % by mole. After melting, the starting compositions will have changed to compositions which contain more $SiO_2$.

| Component | Glass 1 | Glass 2 | Glass 3 | Glass 4 | Glass 5 | Glass 6 | Glass 7 | Glass 8 |
|---|---|---|---|---|---|---|---|---|
| $SiO_2$ | 40 | 50 | 60 | 60 | 50 | 70 | 60 | 60 |
| $GeO_2$ | 30 | 20 | 10 | 20 | 30 | 0 | 0 | 7 |
| $B_2O_3$ | 15 | 15 | 15 | 10 | 10 | 15 | 15 | 15 |
| $P_2O_5$ | 15 | 15 | 15 | 10 | 10 | 15 | 15 | 15 |
| $WO_3$ | 0 | 0 | 0 | 0 | 0 | 0 | 10 | 0 |
| $As_2O_3$ | 0 | 0 | 0 | 0 | 0 | 0 | 0 | 3 |

In the following table, properties of the glasses are summarized. Here, Alpha is the expansion coefficient in ppm/K, SR is the acid stability, measured according to the standard ISO 8424 for optical glasses, and n is the refractive index.

|  | Va (° C.) | Tg (° C.) | Alpha | SR | Refractive index (n) | Abbe number |
|---|---|---|---|---|---|---|
| Glass 1 | 1024 | 592 | 5.49 | 4 | 1.536 | 59.6 |
| Glass 2 | 1130 | 626 | 4.98 | 4 | 1.518 | 62.6 |
| Glass 3 | 1203 | 661 | 4.62 | 3 | 1.506 | 65.3 |
| Glass 4 | 1331 | 640 | 4.49 | 3 | 1.507 | 62.2 |
| Glass 5 | 1239 | 599 | 4.96 | 4 | 1.524 | 58.8 |
| Glass 6 | nm* | 702 | 4.04 | 2 | nm* | nm* |
| Glass 7 | nm* | 657 | 4.03 | nm* | nm* | nm* |
| Glass 8 | 1162 | 641 | 4.65 | 3 | 1.511 | 63.2 | nm* means: not measured.

In particular, the glasses with high processing temperature can be produced in crucibles with a volume for ½ litres only with moderate homogeneity. Therefore, the given property values may have a higher standard deviation as is common otherwise. In particular, this applies to the optical constants refractive index and Abbe number.

The values for the glasses show that the glasses according to the present invention fulfil the desired properties of a low processing temperature and/or glass transition temperature and thus facilitate the production in conventional melting aggregates. The requirements regarding the other properties such as expansion coefficient, refractive index and Abbe number are satisfactory. In particular, the expansion coefficients of the glasses according to the present invention are much closer to Si than the expansion coefficient of $SiO_2$. Further, the refractive indices and the Abbe numbers of the glasses according to the present invention are clearly different from those of $SiO_2$ so that they can be used advantageously in imaging optics in a complementary way to $SiO_2$.

The invention claimed is:

1. A glass for micro structure components, said glass consisting of (in % by mole):

| $SiO_2$ | 40-70 |
|---|---|
| $GeO_2$ | 0-30 |
| $B_2O_3$ | 5-20 |
| $P_2O_5$ | 5-20 |
| $WO_3$ | 0-10 |
| $As_2O_3$ | 0-10 |
| $Yb_2O_3$ | 0-5 |
| $Lu_2O_3$ | 0-5. |

2. The glass according to claim 1, consisting of (in % by mole):

| $SiO_2$ | 50-65 |
|---|---|
| $GeO_2$ | 5-25 |
| $B_2O_3$ | 10-18 |
| $P_2O_5$ | 10-18 |
| $WO_3$ | 0-5 |
| $As_2O_3$ | 0-5 |
| $Yb_2O_3$ | 0 |
| $Lu_2O_3$ | 0. |

3. The glass according to claim 1, wherein tungsten oxide and arsenic oxide are not contained.

4. The glass according to claim 1, consisting of (in % by mole):

| $SiO_2$ | 57-63 |
|---|---|
| $GeO_2$ | 5-12 |
| $B_2O_3$ | 12-17 |
| $P_2O_5$ | 12-17. |

5. A method for the production of a glass according to claim 1, comprising the following steps:
   melting of a homogenous glass in a conventional tank with refractory bricks or in a Pt or Pt/Rh crucible
   forming of a casting or a rolled, pulled or floated flat glass
   cold finishing of the glass raw forms to wafers.

6. Micro structure components comprising a glass according to claim 1, characterized in that the micro structures are prepared by the RIE method and the micro structure components are micro arrays, Fresnel lenses, micro wafers or micro lens wafers.

7. A method of making a micro structure component, said method comprising the steps of:
   a) providing a glass body with a glass composition consisting, in % by mole, of 40-70, $SiO_2$; 0-30, $GeO_2$; 5-20, $B_2O_3$; 5-20, $P_2O_5$; 0-10, $WO_3$; 0-10, $As_2O_3$; 0-5, $Yb_2O_3$; 0-5, $Lu_2O_3$; and
   b) performing a reactive ion etching of the glass body to obtain a micro structure glass body.

8. The method according to claim 7, wherein the reactive ion etching is performed with a plasma gas comprising $CF_4$ or $SF_6$.

9. The method according to claim 7, wherein the reactive ion etching of the glass body is performed so that the micro structure glass body is a microarray, a Fresnel lens, a micro wafer, or a micro lens wafer.

* * * * *